(12) United States Patent
Usui et al.

(10) Patent No.: US 6,336,039 B1
(45) Date of Patent: *Jan. 1, 2002

(54) IC CARD-TYPE RADIO COMMUNICATION DEVICE

(75) Inventors: Yuzo Usui; Yasuhiro Arai, both of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/662,894

(22) Filed: Sep. 15, 2000

Related U.S. Application Data

(63) Continuation of application No. 08/989,138, filed on Dec. 11, 1997, which is a continuation of application No. 08/395,972, filed on Feb. 28, 1995, now abandoned.

(30) Foreign Application Priority Data

May 20, 1994 (JP) .............................. 6-106537

(51) Int. Cl.[7] .................................. H04B 1/40
(52) U.S. Cl. ...................... 455/558; 455/556; 455/565
(58) Field of Search ................. 455/556, 557, 455/558, 573, 575, 565, 566, 550, 90, 66, 74, 348, 349, 351, FOR 121, 102; 379/433, 434; 375/216, 222; 710/14, 64, 69, 72

(56) References Cited

U.S. PATENT DOCUMENTS

| | | |
|---|---|---|
| 3,744,833 A | 7/1973 | Berducone |
| 4,684,870 A | 8/1987 | George et al. |
| 5,020,090 A | 5/1991 | Morris |
| 5,027,394 A * | 6/1991 | Ono et al. ............... 379/434 |
| 5,140,632 A | 8/1992 | Anten |
| 5,260,998 A * | 11/1993 | Takagi ..................... 379/434 |
| 5,303,291 A | 4/1994 | Takagi et al. |
| 5,333,176 A | 7/1994 | Burke et al. |
| 5,335,276 A | 8/1994 | Thompson et al. |

(List continued on next page.)

FOREIGN PATENT DOCUMENTS

| | | |
|---|---|---|
| EP | 0 434 231 | 6/1991 |
| EP | 0 610 025 A1 | 8/1994 |
| JP | 4-140895 | 5/1992 |
| JP | 6-152696 | 5/1994 |
| WO | WO 91/07837 | 5/1991 |
| WO | WO 94/21058 | 9/1994 |
| WO | WO 92/29968 | 12/1994 |

OTHER PUBLICATIONS

Leonard, Wilt, PCMCIA–Sized Radio Links Portable WLAN Terminals, Electronic Design, vol. 41, No. 16, Aug. 5, 1993, pp. 45–46, 48, 50.

Razavi: RF Microelectronics, section 3.1, pp. 54–56.

*Primary Examiner*—Lester G. Kincaid
(74) *Attorney, Agent, or Firm*—Staas & Halsey, LLP

(57) ABSTRACT

An IC card-type radio communication device includes a main body of equipment, a storage unit, a sound input unit, a sound output unit and a modulation-demodulation unit. The main body of equipment has an interface which is in accordance with a predetermined standard and forms a physical shape which is in accordance with the standard. The main body of equipment is inserted into an entry installed on an external terminal unit. The storage unit is installed on the main body of equipment and stores an attribute information and an information necessary for data communication with the terminal unit. The sound input unit inputs a sound signal when a conversation is executed and the sound output unit outputs the sound signal. The modulation-demodulation unit modulates and demodulates data of the terminal unit on the basis of the information stored in the storage unit when the main body of equipment is inserted into the entry installed on the terminal unit, and modulates and demodulates the sound signal when the conversation is executed.

4 Claims, 15 Drawing Sheets

U.S. PATENT DOCUMENTS

| | | |
|---|---|---|
| 5,335,368 A | 8/1994 | Tamura |
| 5,361,061 A | 11/1994 | Mays et al. |
| 5,373,149 A | 12/1994 | Rasmussen |
| 5,410,749 A | 4/1995 | Siwiak et al. |
| 5,450,619 A | 9/1995 | Maeda |
| 5,479,480 A | 12/1995 | Scott |
| 5,497,339 A | 3/1996 | Bernard |
| 5,845,217 A | 12/1998 | Lindell et al. |
| 6,085,109 A * | 7/2000 | Koga ......................... 455/552 |

* cited by examiner

IC CARD-TYPE RADIO COMMUNICATION DEVICE

This application is a continuation of application Ser. No. 08/989,138 filed Dec. 11, 1997, which is now pending, which is a continuation of application Ser. No. 08/395,972, filed Feb 28, 1995, now abandoned.

BACKGROUND OF THE INVENTION

1. Field of the Invention

The present invention relates to an IC card-type radio communication device and more particularly, to an IC card-type radio communication device in which both radio data communication and a conversation are executed using a portable telephone.

2. Description of the Related Art

In an example 1 of a traditional radio communication device, the portable telephone is connected to a modem (modulator and demodulator) or an IC card which executes a digital signal processing through a cable for a signal wire, when the radio communication is executed by using the portable telephone. For instance, a digital data transmitted from a personal computer is modulated by the modem installed on the IC card to obtain an analog signal.

The analog signal is outputted to a head set terminal of the portable telephone by the cable, and the analog signal is modulated into a radio signal by the portable telephone. The radio communication is executed by the modulated radio signal.

However, the conventional radio communication device includes the portable telephone, the IC card installed on the modem and the cable. For this reason, an operational performance of the device is deteriorated and the cost is rather high.

Another conventional radio communication device exists which unifies the portable telephone and a modem circuit through the cable so that the operational performance will be improved.

However, such accessories as the cable and RS232C connector are necessary for connecting the personal computer to the modem circuit. Also, it is difficult to make the accessories portable, since the RS 232C connector itself is relatively large.

Further, a third conventional radio communication device exists in which an interface between the personal computer and the portable telephone is formed in accordance with a standard of Japan Electronic Industry Development Association (JEIDA)/Personal Computer Memory Card International Association (PCMCIA). However, a cable for connecting an earphone or a microphone to the portable telephone is needed, when the portable telephone is used for a conversation.

Also, an IC card mentioned in 140895 number of an official report of patent disclosure in 1992 was used for the radio communication, and it was miniaturized to the size of a business card. However, a dedicated interface for connecting the IC card to a host computer is needed.

SUMMARY OF THE INVENTION

An object of the present invention is to provide an IC card-type radio communication device which maintains a compatibility of interface for traditional data communication, and improves a portability without using accessories.

The IC card-type communication device of the present invention includes a body of equipment, a storage unit, a sound input unit, a sound output unit and a modulation-demodulation unit. The IC card-type communication device of the present invention has a physical interface and an electrical interface of JEIDA/PCMCIA standard on a part of the portable telephone, and reduces such accessories as a cable and executes a radio conversation and a radio data communication.

The body of equipment has an interface unit which is in accordance with a predetermined standard and forms a physical shape which is in accordance with the standard, and is inserted into a entry installed on an external terminal unit. The body of equipment is, for instance, a sheet-type IC card.

The storage unit is installed on the body of equipment, and stores an attribute information of the body of equipment and an information necessary for data communication to the data of the terminal unit. The storage unit is a ROM (Read Only Memory) and a RAM (Random Access Memory) and so on.

The sound input unit inputs a sound signal when a conversation is executed. The sound input unit is a microphone and so on. The sound output unit outputs the sound. The sound output unit is a speaker and so on.

The modulation-demodulation unit modulates and demodulates the data of the terminal unit on the basis of the information stored in the storage unit, when the body of equipment is inserted into the entry installed on the terminal unit, and modulates and demodulates the sound signal when the conversation is executed. The modulation-demodulation unit includes of LSI(Large Scale Integrated circuit) and so on.

Hereupon, it is preferable that the predetermined standard is at least one of a standard of Japan Electronic Industry Development Association (JEIDA) and a standard of Personal Computer Memory Card International Association (PCMCIA).

Further, a joining body of equipment which forms a plane that is almost identical to the body of equipment so as to be registered with the body of equipment, and is joined to the body of equipment in one side can be also provided. The sound input unit can be installed on one of the joining body of equipment and the body of equipment, and the sound output unit can be installed on the other of the joining body of equipment and the body of equipment.

The joining body of equipment can be opened in a predetermined angle to the body of equipment when the conversation is executed, and the body of equipment can be inserted into the entry installed on the terminal unit, when the data communication by the terminal unit is executed.

Further, a joining body of equipment which has a plane that is almost identical to the body of equipment and an arbitrary thickness can be provided. The joining body of equipment can be isolated from the body of equipment electrically.

Besides, one of the joining body of equipment and the body of equipment can be provided with a slot unit which is slid physically and is locked in a predetermined position by the other of the joining body of equipment and the body of equipment.

Further, a magnet can be installed on each surface of the joining body of equipment and the body of equipment so as to unify the joining body of equipment and the body of equipment physically.

Further, an input unit for inputting a dial information when the conversation is executed, and an invalidating unit for invalidating the dial information transmitted from the input means when the input is inserted into the entry of the terminal unit can be provided. The input unit is, for instance, a sheet switch.

The body of equipment can be provided with a secondary cell unit for supplying the sound input unit, the sound output unit, the storage unit and the modulation-demodulation unit with electric power. The secondary cell unit is charged by the electric power supplied from a power supply of the terminal unit, when the interface is inserted into a connector which is installed on the entry and is in accordance with the standard.

An indicator which displays a charging state of the secondary cell unit which is charged by the electric power supplied from the power supply of the terminal unit can be provided.

Another secondary cell unit which forms a shape that is almost identical to the secondary cell unit also can be provided. The another secondary cell unit is connected to the body of equipment through the interface unit, when the conversation is executed. The another secondary cell unit is removed from the body of equipment and the body of equipment is connected to the entry installed on the terminal unit, when the data communication is executed.

A voltage conversion circuit for receiving an electric power supplied from a power supply installed on an external terminal unit to convert a predetermined voltage into another voltage, and a cell unit for executing a charge with another voltage converted by the voltage conversion circuit also can be provided.

An information storage unit for storing specific information and a control unit for exchanging the information stored in the information storage unit between the information storage unit and the terminal unit, when the body of equipment is inserted into the entry installed on the terminal unit also can be provided.

An input unit for inputting a personal identification password as a personal information is provided, and the control unit writes the personal identification password inputted from the input unit into the information storage unit to check the password between the information storage unit and the terminal unit. The input unit is, for instance, a switch.

According to the present invention, the body of equipment has an interface unit which is in accordance with a predetermined standard and forms a physical shape which is in accordance with the standard, and is inserted into an entry installed on an external terminal unit. Namely, the body of equipment is inserted into the entry of the terminal unit without using such accessories as a cable, and the interface unit can be connected to the terminal unit without difficulty.

Besides, the IC card-type radio communication device has a radio data communication function according to the storage unit and the modulation-demodulation unit, and has a radio conversation function according to the sound input unit, the sound output unit and the modulation-demodulation unit. Accordingly, it is not necessary to use such accessories as a cable for a microphone and a speaker, and the portability can be improved.

Besides, the compatibility with the traditional data communication interface can be maintained, if the standard is one of a standard of Japan Electronic Industry Development Association (JEIDA) and a standard of Personal Computer Memory Card International Association (PCMCIA).

Further, the conversation can be executed by using the sound input unit and the sound output unit in a condition that the joining body of equipment is opened to the body of equipment in a predetermined angle. The data communication according to the terminal unit can be executed by inserting the body of equipment into the entry installed on the terminal unit.

The portability can be improved, since the joining body of equipment which has a plane that is almost identical to the body of equipment and has an arbitrary thickness is isolated from the body of equipment electrically.

The unification of the joining body of equipment and the body of equipment can be attempted, since the slot unit installed on one of the joining body of equipment and the body of equipment is slid and is locked in the predetermined position by the other of joining body of equipment and the body of equipment.

The joining body of equipment can be unified with the body of equipment by the mutual attraction of the magnet on the surface of the joining body of equipment and the magnet on the surface of the body of equipment.

For instance, a wrong operation can be avoided, since the invalidating circuit invalidates a dial information transmitted by an accidental push of a sheet switch, when the sheet switch is inserted into the entry of the terminal unit.

The consumption of the secondary cell unit can be restrained, since the secondary cell unit is charged by the electric power supplied from a power source of the terminal unit, when the interface unit is inserted into a connector of the terminal unit. The usage of the secondary cell unit can be understood, since a charging state of the secondary cell unit is displayed on the indicator.

Another secondary cell unit is connected to the body of equipment through the interface to receive an electric power supply of the another secondary cell unit, when the conversation is executed. The consumption of the secondary cell unit can be reduced, since the another secondary cell unit is removed from the body of equipment and the body of equipment is connected to the entry installed on the terminal unit to charge the secondary cell unit, when the data communication is executed.

The utility value of the device will be raised, since the control unit exchanges the information stored in the information storage unit between the information storage unit and the terminal unit, when the body of equipment is inserted into the entry installed on the terminal unit.

The exchange of the personal information between the information storage unit and the terminal unit can be restricted, since the control unit writes the personal identification password inputted from the input unit into the information storage unit to check the password between the information storage unit and the terminal unit.

DETAILED DESCRIPTION OF THE PREFERRED EMBODIMENT

Figure 1:
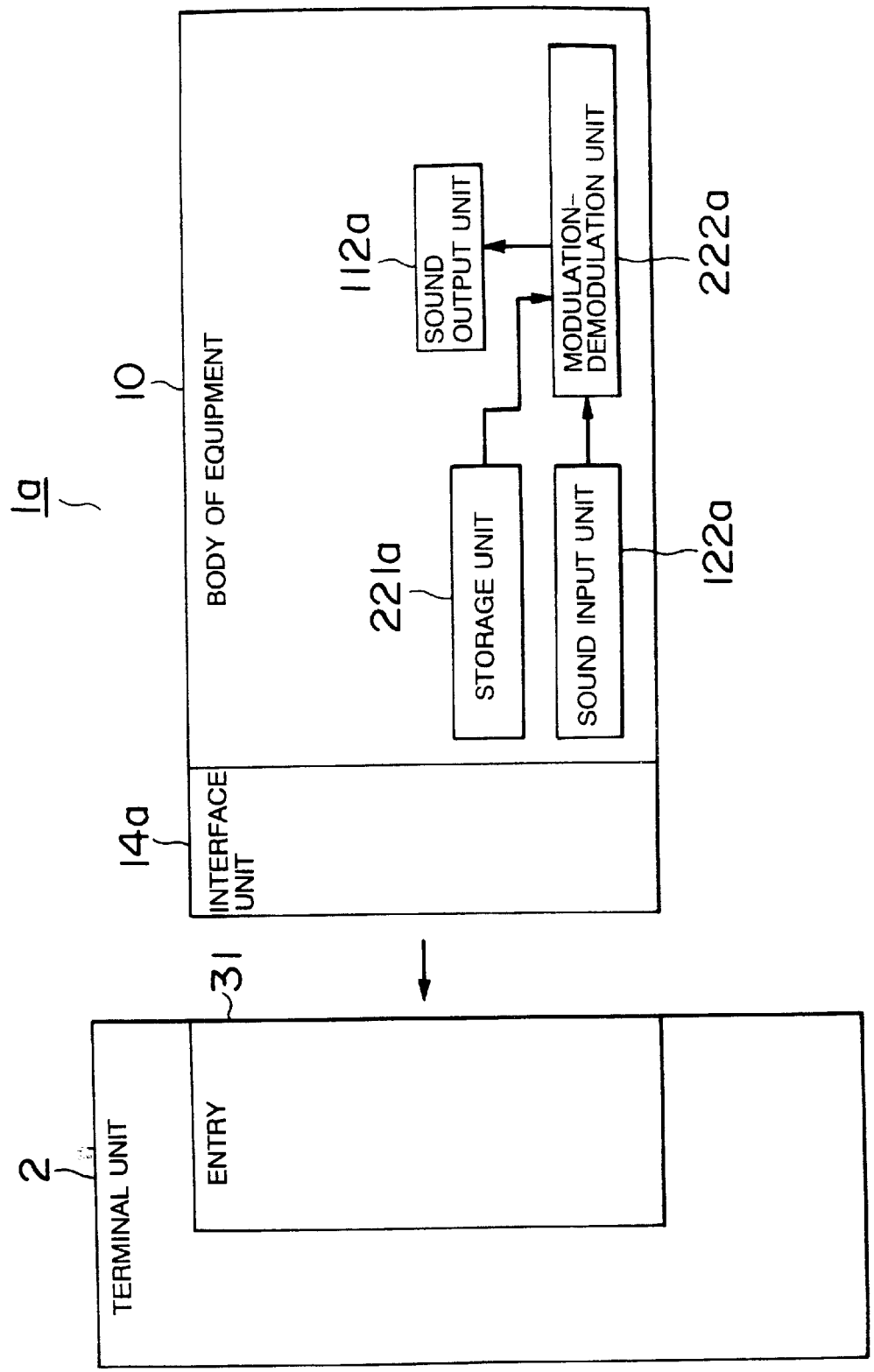
FIG. 1 is a construction diagram indicating an IC card-type radio communication device according to the embodiment 1 of the present invention.

The embodiments of the present invention will be described by referring to the drawings as follows.

<Embodiment 1>

FIG. 1 is a construction diagram indicating an IC card-type radio communication device according to the embodiment 1 of the present invention. The IC card-type radio communication device 1a of the embodiment 1 has a interface unit 14a which is in accordance with a predetermined standard, and forms a physical shape which is in accordance with the standard, and is provided with a body of equipment 10 which can be inserted into an entry installed on an external terminal unit 2. The body of equipment is a sheet-type IC card.

The predetermined standard is at least one of a standard of Japan Electronic Industry Development Association (JEIDA) and a standard of Personal Computer Memory Card international Association (PCMCIA).

The body of equipment 10 comprises a storage unit 221a, a sound input unit 122a, a sound output unit 112a and a modulation-demodulation unit 222a to which the units are connected. The storage unit 221a stores an attribute information of a card and an information necessary for data communication to the data of the terminal unit. The storage unit 221a is a ROM or a RAM and so on.

The sound input unit 122a inputs a sound signal when a conversation is executed. The sound input unit 122a is a microphone and so on. The sound output unit 112a outputs the sound signal. The sound output unit 112a is a speaker and so on. The modulation-demodulation unit 222a modulates and demodulates the data of the terminal unit 2 on the basis of the information stored in the storage unit 221a, when the body of equipment 10 is inserted into the entry installed on the terminal unit 2. The modulation-demodulation unit 222a modulates and demodulates the sound signal when the conversation is executed, and consists of LSI (large scale integrated circuit) and so on.

The terminal unit 2 has the entry 31, and is, for instance, a personal computer. The giving and receiving, of the data is executed between the terminal unit 2 and the body of equipment 10 through the entry 31.

Figure 2:
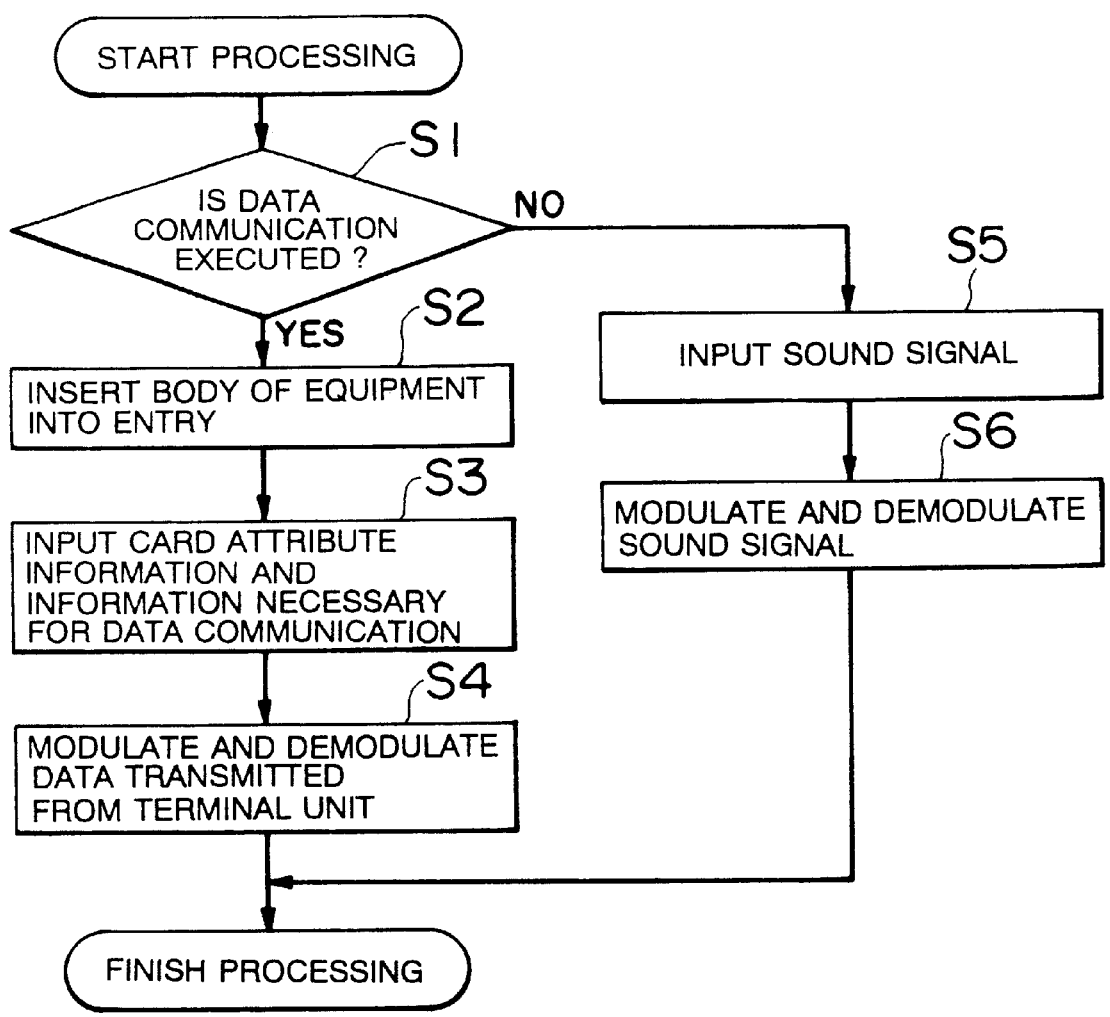
FIG. 2 is a flowchart indicating an operation of an IC-card-type radio communication device according to the embodiment 1 of the present invention.

FIG. 2 is a flowchart indicating an operation of an IC card-type radio communication device according to the embodiment 1 of the present invention. The operation will be described by referring to FIG. 1 and FIG. 2.

First of all, one of a data communication and a conversation is selected (Step S1). The body of equipment should be inserted into the entry 31 of the terminal unit 2, when the data communication is selected (Step S2).

Then, the modulation-demodulation unit 222a inputs an attribute information of a card and an information necessary for data communication from the storage unit 221a (Step S3). The modulation-demodulation unit 222a modulates and demodulates the data stored in the terminal 2 on the basis of the information through the interface unit 14a (Step S4).

On the other hand, the modulation-demodulation unit 222a inputs a sound signal from the sound input unit 122a, when the conversation is executed (Step S5). Further, the modulation-demodulation unit 222a modulates the sound signal inputted from the sound input unit 122a and transmits it outside with a radio signal (Step S6).

Besides, the modulation-demodulation unit 222a demodulates the received radio signal and outputs the sound signal to the sound output unit 112a.

As mentioned hereinbefore, according to the embodiment 1, the body of equipment 10 has an interface unit 14a which is in accordance with a predetermined standard and forms a physical shape which is in accordance with the standard, and is inserted into an entry 31 of an external terminal unit 2. Namely, the body of equipment 10 is inserted into the entry 31 of the terminal 2 without using such accessories as a cable, and the interface unit 14a can be connected to the terminal unit 2 without difficulty.

Besides, the IC card-type radio communication device has a radio data function according to the storage unit 221a and the modulation-demodulation unit 222a, and a radio conversation function according to the sound input unit 122a, the sound output unit 112a and the modulation-demodulation unit 222a.

Accordingly, such accessories as the cable for the microphone and the speaker are needless, and the portability can be improved. Besides, the compatibility with the traditional data communication interface can be maintained, if the standard is one of a standard of Japan Electronic Industry Development Association (JEIDA) and a standard of Personal Computer Memory Card International Association (PCMCIA).

<Embodiment 2>

Figure 3:
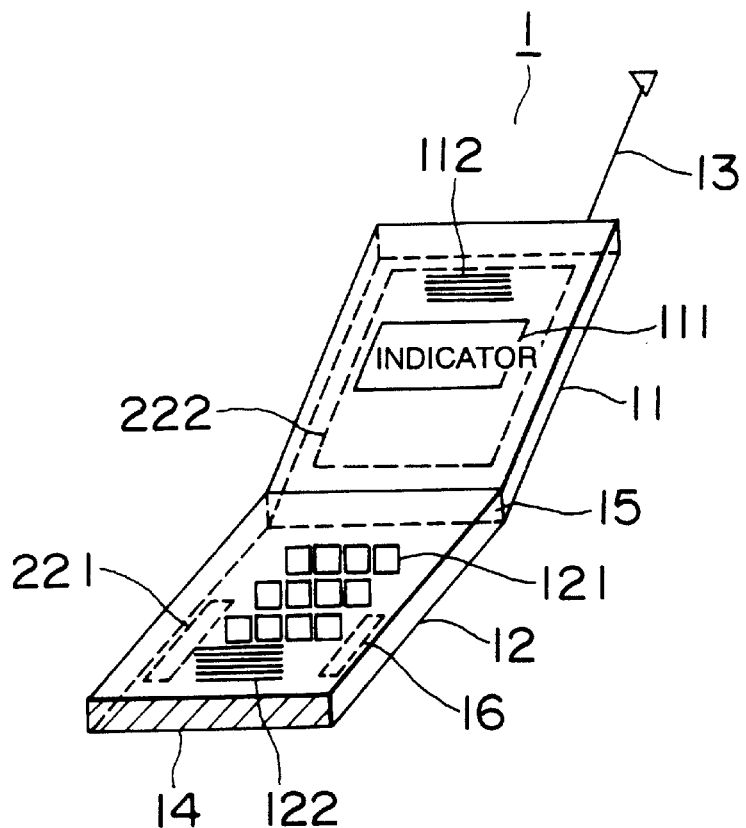
FIG. 3 is a diagram indicating a state of use of an IC card-type radio communication device according to the embodiment 2 of the present invention, when a data communication is executed and a conversation is executed.

Then, the embodiment 2 of an IC card-type radio communication device of the present invention will be described. The IC card-type radio communication device executes a radio data communication and a radio conversation. FIG. 3 is a diagram indicating a state of use of the IC card-type radio communication device of the embodiment 2, when the data communication is executed, and when the conversation is executed.

The IC card-type radio communication device 1 (hereinafter referred to as communication device) of the embodiment 2 comprises an upper part body of equipment 11, a lower part body of equipment 12 and an antenna 13 for radio equipment which is installed on one side of the upper part body of equipment 11 and transmits a radio signal.

A 68 pin connector 14 of JEIDA/PCMCIA standard for connecting the communication device 1 to the personal computer 2 which is mentioned later is installed on the one side of the lower part body of equipment 12.

The lower part body of equipment 12 has a physical shape which is in accordance with JEIDA/PCMCIA standard.

The upper part body of equipment 11 has a plane which is almost identical to the lower part body of equipment 12 and has a predetermined thickness.

Figure 4:
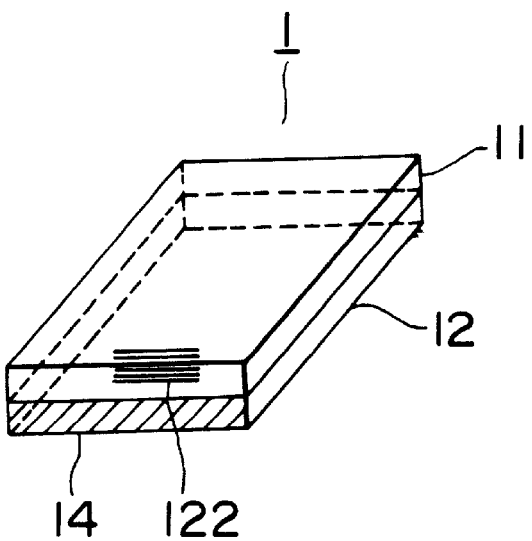
FIG. 4 is a diagram indicating a receiving state of an IC card-type radio communication device of the embodiment 2, when it is unused.

The upper part body of equipment 11 is constructed to be connected to the lower part body of equipment 12 in one side 15 physically and electrically and to be registered with the lower part body of equipment 12. FIG. 4 is a diagram indicating a receiving state of the communication device 1, when it is unused. The upper part body of equipment 11 is registered with the lower part body of equipment 12, when the communication device 1 is not used.

The upper part body of equipment 11 comprises an indicator 111 which displays a dial information and so on, a speaker 112 which sound-outputs a receiving signal received from the antenna 13 and a portable telephone circuit 222 which is mentioned later.

The lower part body of equipment 12 comprises a dial button 121 (or a sheet switch) which inputs a dial information, a microphone 122 which inputs a sound signal, a JEIDA card-type secondary cell unit (hereinafter, referred to as secondary cell unit), a secondary cell unit and an attribute memory 221 which is mentioned later. Further, the portable telephone circuit 222 can be installed on the lower part body of equipment.

Figure 5:
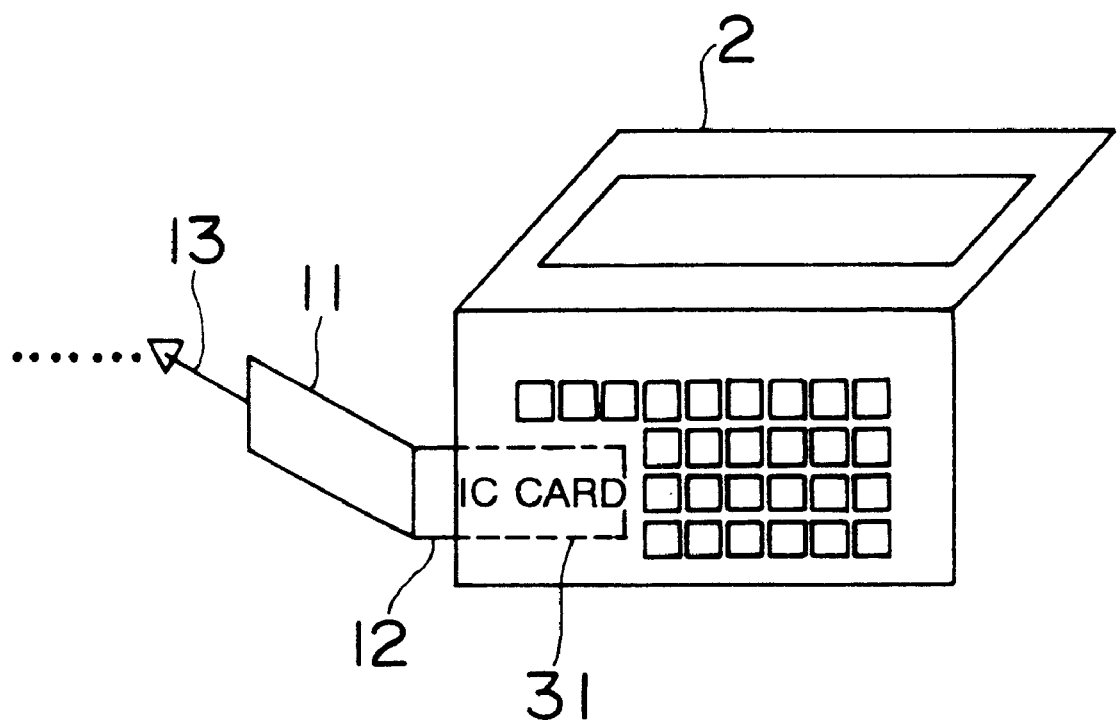
FIG. 5 is a diagram indicating a state of a radio data communication when an IC card-type radio communication device is mounted on a personal computer of the embodiment 2.

FIG. 5 is a diagram indicating a state of a radio data communication when the communication device 1 is mounted on a personal computer. As shown in FIG. 5, the upper part body of equipment 11 should be set to a state in which it is opened to the lower part body of equipment 12 in a predetermined angle. In the state, the lower part body of equipment 12 should be inserted into an IC card slot (an entry) 31 installed on the personal computer 2.

Then, the connector 14 installed on the lower part body of equipment 12 is connected to the unillustrated connector on the personal computer 2 side. And the data stored in the personal computer 2 is transmitted to the body of equipment 11, 12 through the connector 14. By these operations, the radio data communication by the personal computer 2 will be executed.

Figure 6:
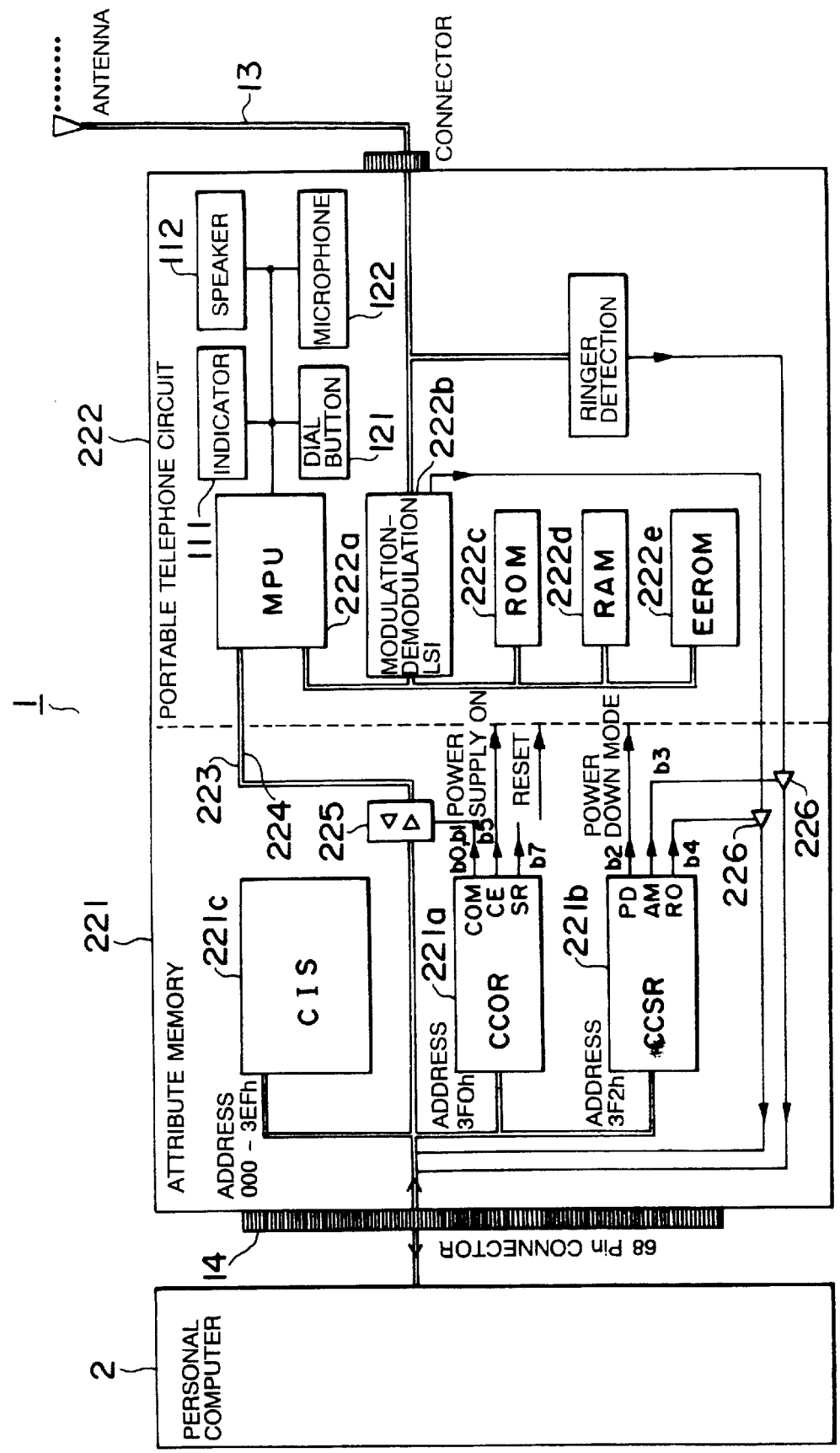
FIG. 6 is a construction diagram indicating an IC card-type radio communication device of the embodiment 2.

FIG. 6 is a construction diagram indicating an IC card-type radio communication device of the embodiment 2. In FIG. 6, the communication device 1 comprises the connector 14 as JEIDA/PCMCIA interface which is connected to the personal computer 2, the attribute memory 221 and the portable telephone circuit 222.

The attribute memory 221 is a card configuration register card which sets up a card attribute and so on. The attribute memory 221 comprises a card configuration option register 221a (hereinafter referred to as CCOR221a hereinafter), a card configuration status register 221b (hereinafter referred to as CCSR221b) and a card information structure 221c (hereinafter referred to as CIS221c).

The CIS221c consists of a read only memory (ROM), and stores a device information which indicates a attribute of the communication device 1, such product information as a maker of product and a version of product, an interruption mode information and a voltage and electric power information in addresses of 000-3EFh.

The CCOR221a consists of a random access memory (hereinafter referred to as RAM), and stores a selective information of COM 1, 2, 3, 4, a card enable information CE for switching the power supply ON and a soft reset information SR in an address 3F0h.

The CCSR221b consists of RAM, and stores a power down mode selective information PD, an audio monitor selective information AM and a ringer output selective information RO in an address 3F2h.

The portable telephone circuit 222 comprises a microprocessor (MPU) 222a, a modulation-demodulation LSI222b, a ROM222c, a RAM222d and an EEROM222e. Further, the microprocessor controls each of the indicator 111, the speaker 112, the dial button 121 and the microphone 122.

The microprocessor 222a executes a pocketing of data transmitted from the personal computer 2, a detection of errors and a call control, and executes such functions as a modem function corresponding to the contents of the ROM222c at the same time.

The modulation-demodulation LSI222b modulates and demodulates the data for the personal computer 2 on the basis of the commands of the microprocessor 222a, when the data communication is executed, and modulates and demodulates the sound signal when the conversation is executed. The modulation-demodulation LS1222b outputs a digital audio to the personal computer 2 through a gate 226.

Such device programs as a communication protocol, a network control procedure and a modulation-demodulation program are stored in the ROM222c. Such information as a data compression is stored in the RAM222d. Such information as a setting information and a telephone number are stored in the EEROM222e.

Further, a address bus 223 and a data bus 224 are connected to a MPU222a and a gate 225. The gate 225 is opened by a COM information transmitted from the CCOR221a.

Figure 7:
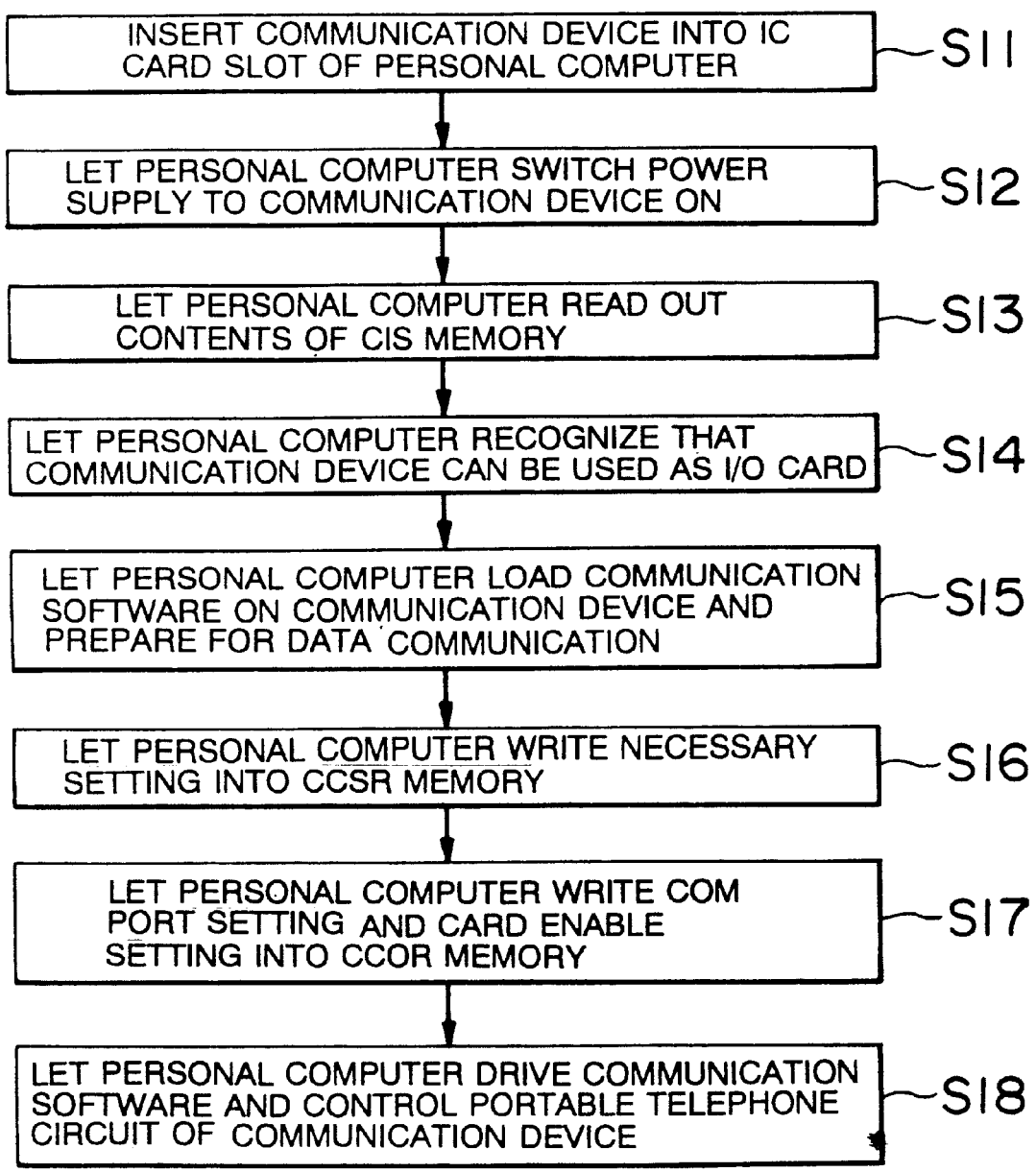
FIG. 7 is a flowchart indicating an operation of the embodiment 2 when a radio data communication is executed.

FIG. 7 is a flowchart indicating an operation of the embodiment 2 when a radio data communication is executed. Then, the operation of the embodiment 2 constructed in the above-mentioned way will be described. First of all, the communication device 1 is inserted into the personal computer 2, and the connector 14 consisting of 68 pin is inserted into the IC card slot 31 installed on the personal computer 2 (Step S11).

Then, the personal computer 2 detects that a card diction CD transmitted from the communication device 1 is "L", and actuates the power source of the communication device 1 (Step S12). The personal computer 2 reads out the contents stored in the CIS221c which is loaded within the communication device 1, namely, the device information (Step S13).

Then, the personal computer 2 recognizes from the contents of the CIS221c that the communication device 1 can be used as an I/O card (Step S14).

Further, the personal computer 2 prepares for the data communication in which a communication software is loaded on the communication device 1 (Step S15). The personal computer 2 writes such necessary information as an audio monitor AM into the CCSR221b loaded within the communication device 1 (Step S16).

And the personal computer 2 writes such information as an information of COM port and a card enable CE into the CCOR221a loaded within the communication device 1

(Step S17). Then, the portable telephone circuit 222 will be driven (the power source is ON) by writing the "ON" of the card enable CE.

Besides, the personal computer 2 opens the gate 225 by writing the selective information COM of the COM port, and connects the data bus 224 and the address bus 223 to the MPU222a.

Further, the personal computer 2 drives the prepared communication software to control the portable telephone circuit 222 installed on the communication device 1 (Step S18). Then, the microprocessor 222a reads out the communication protocol, the network control procedures and the modulation-demodulation program stored in the ROM222c to execute them.

Further, the modulation-demodulation LSI222b executes the transmission-receiving of the modulated data in accordance with the instructions of the microprocessor 222a to initiate the radio data communication. Besides, the radio conversation also can be executed in the same procedure as the radio data communication.

As mentioned hereinbefore, the radio data communication and the radio conversation can be executed by only inserting the lower part body of equipment 12 which has a physical shape of JEIDA/PCMIA standard within the communication device 1 and the connector 14 of JEIDA/PCMIA standard into the personal computer 2. Accordingly, the communication device 1 also can be used as a portable telephone without using such accessories as a cable, and the portability will be improved.

Figure 8:
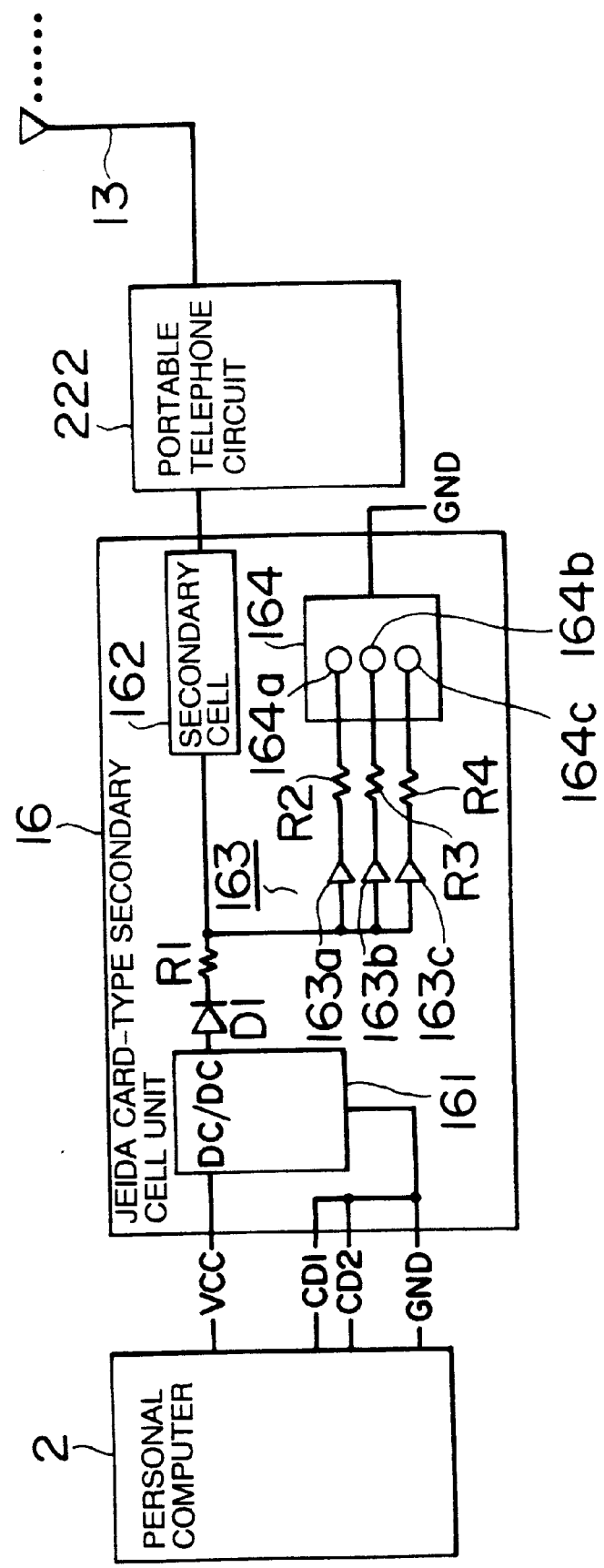
FIG. 8 is a construction diagram indicating a secondary cell unit.

Then, the secondary cell unit 16 which is one characteristic of the embodiment 2 will be described. FIG. 8 is a diagram indicating a construction of the secondary cell unit 16. In FIG. 8, the secondary cell unit 16 is connected to the personal computer 2 through one part of terminals VCC, CD1, CD2 installed on the connector 14, and is connected to the antenna 13 through the portable telephone circuit 222.

The secondary cell unit 16 comprises a DC convertor 161 which is connected to the terminal VCC, a secondary cell 162, a comparator 163 consisting of the comparators 163a–163c and an indicator 164 which is connected to the secondary cell 162 through each of the comparators and the resistances R2–R4 corresponding to the comparator. The secondary cell 162 is connected to the DC-DC convertor 161 through the diode D1 and the resistor R1, and is connected to the portable telephone circuit 222.

Further, a voltage stabilization circuit which sets the voltage transmitted from the personal computer 2 to the predetermined voltage can be used in place of the DC-DC convertor 161.

In the above-mentioned construction, as shown in FIG. 5, the personal computer 2 will connect the card diction terminals CD1 and CD2 on the JEIDA/PCMCIA interface to the terminal GND, if the lower part body of equipment 12 is inserted into the IC card slot 31.

Then, the personal computer 2 recognizes that an ordinary IC card is mounted when the lower part body of equipment 12 is inserted into the IC card slot 31, and supplies the terminal VCC with the electric power. The electric power is supplied to the secondary cell 162 through the DC-DC convertor 161 so that the secondary cell 162 will be charged.

Then, the portable telephone circuit 222 is actuated by the electric power supplied from the secondary cell 162, and the radio data communication is executed.

Besides, the charging voltage which is charged into the secondary cell 162 is compared with the threshold voltage which was set up previously in each of comparators 163a–163c. The corresponding light-emitting diodes 164a–164c installed on the indicator 164 are lighted up, when the charging voltage exceeds the threshold voltage.

Accordingly, the charging state of the secondary cell 162 can be recognized by the number of lightings of the light-emitting diode. Hereupon, the indicator 111 can be provided with the function mentioned above, even though the indicator 164 is provided separating from the indicator 111.

As mentioned hereinbefore, the portable telephone circuit 222 is actuated and the radio communication can be executed, when the lower part body of equipment 12 is inserted into the personal computer 2 in a state that the upper part body of equipment 11 is opened to the lower part body of equipment 12 in a predetermined angle. In this case, the consumption of the secondary cell 162 can be reduced, since the secondary cell 162 is charged by the electric power supplied from the personal computer 2.

Besides, the secondary cell 162 included in the communication device 1 can be charged by only inserting the lower part body of equipment 12 into the IC card slot 31, even if neither the conversation nor the data communication is executed.

Further, the communication device 1 of the embodiment 2 can be used as a portable telephone by the electric power of the secondary cell 16 included in the communication device 1, when it is not connected to such other terminal units as the personal computer 2.

<Embodiment 3>

Then, the embodiment 3 of the present invention will be described. It is difficult to mount the projects of the dial button 121 on the communication device 1, when the communication device 1 is used as a portable telephone. For this reason, it is effective to load the sheet switch 121a on the communication device 1.

However, it sometimes happens that the sheet switch 121a will be operated wrongly by pressure, if the sheet switch 121a is inserted into the IC card slot 31 of the personal computer 2, when the sheet switch 121a is mounted on the JEIDA/PCMCIA connector 14 side.

Figure 9:
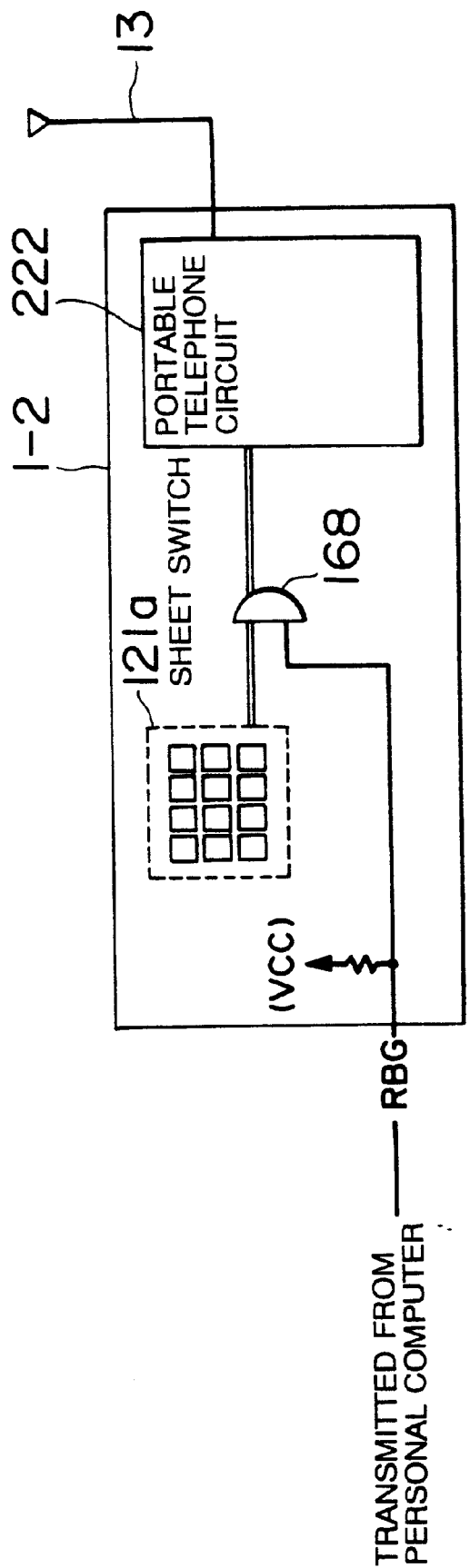
FIG. 9 is a construction diagram indicating principle parts of the embodiment 3 of the present invention.

The communication device 1-2 of the embodiment 3 is constructed to prevent the wrong operation of the sheet switch 121a. FIG. 9 is a diagram indicating a construction of principle parts of the embodiment 3 of the present invention. In FIG. 9, the communication device 1-2 of the embodiment 3 is provided with an AND circuit which obtains a AND of the input information inputted from the sheet switch 121a and the register signal(hereinafter referred to as —REG signal "L") supplied from the personal computer 2 through the connector 14, when the communication device 1-2 is mounted on the personal computer 2 and supplies the portable telephone circuit 222 with the output. Further, other constructions are the same as those of the embodiment 2, so the detailed description about them will be omitted.

According to the above-mentioned construction, —REG signal "L" which is supplied from the personal computer 2 to the card side is inputted into the AND circuit 168, when the sheet switch 121a is inserted into the personal computer 2.

On the other hand, the input information "H" is inputted into the AND circuit 168, when one sheet of a plurality of sheets included in the sheet switch 121a is pushed by the wrong operation.

Then, the output of the AND circuit 168 is converted into "L" so that the portable telephone circuit 222 will not be actuated. Namely, the portable telephone circuit 222 will not be actuated, even if the sheet switch 121a is operated wrongly, so the wrong operation can be avoided.

Further, although the sheet switch 121a is mounted on the communication device 2-1 in the embodiment 3, the wrong operation can be avoided, even if, for instance, the dial switch is mounted.

<Embodiment 4>

Figure 10:
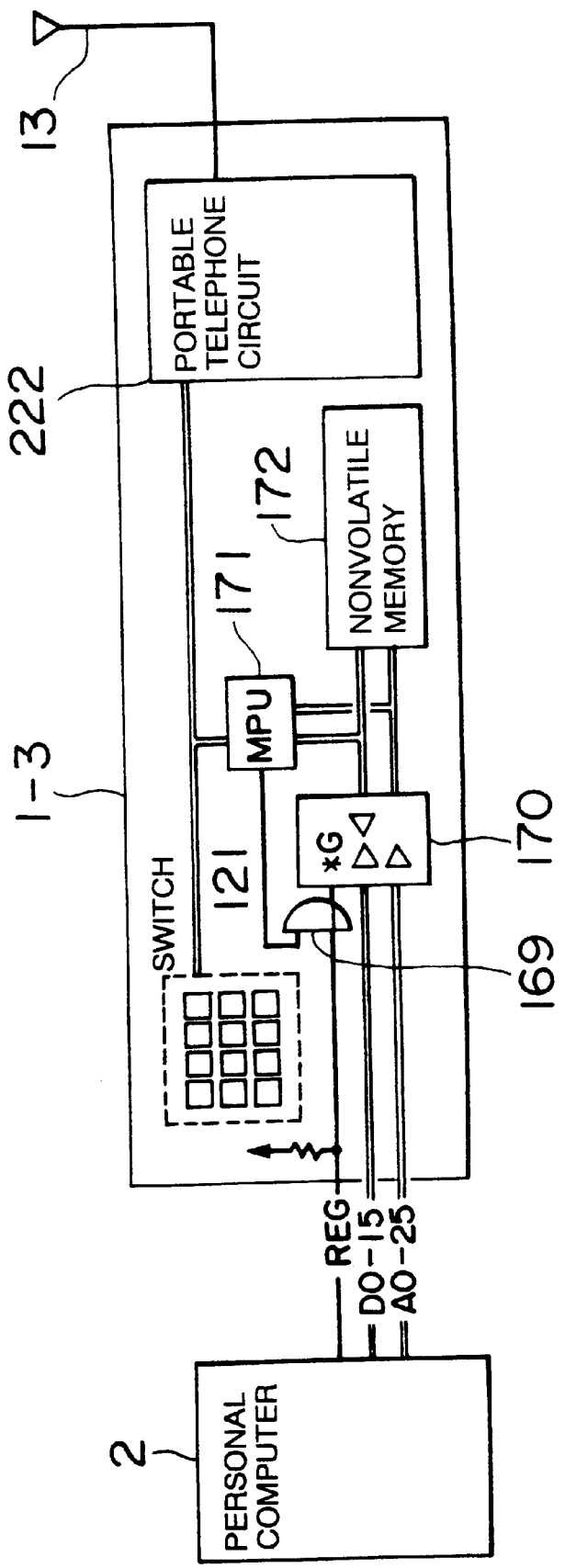
FIG. 10 is a construction diagram indicating principle parts of the embodiment 4 of the present invention.

Then, the embodiment 4 of the present invention will be described. FIG. 10 is a diagram indicating a construction of principle parts of the embodiment 4 of the present invention. In FIG. 10, the communication device 1-3 comprises a dial switch 121, a portable telephone circuit 222, an AND circuit 169, a LSI 170, a nonvolatile memory 172 which stores a telephone directory data and a personal identification password and a MPU 171 which controls the principle parts.

The data bus DO-15 of 16 bits and the address bus AO-25 of 26 bits are connected to the LSI 170 from the personal computer 2 through the connector 14. REG signal is inputted into the AND circuit 169.

Other constructions are the same as those of the embodiment 2, so the detailed description about them will be omitted.

According to the above-mentioned construction, the REG signal will be converted into "L", when the communication device 1-3 is mounted on the IC card slot 31 of the personal computer 2. The output of the AND circuit 169 will be converted into "L", and the output will be inputted into the LSI 170.

The LSI 170 connects the nonvolatile memory 172 to the digital data buses DO–D15 and the analog data buses AO–A15.

By these operations, the nonvolatile memory 172 within the communication device 1-3 can be easily accessed by the personal computer 2.

Besides, the switch selective signal transmitted from the dial switch 121 is outputted to the portable telephone circuit 222 and the MPU 171, and MPU 171 monitors the input from the dial switch 121 all the time.

Hereupon, the MPU 171 executes the writing or the reading of the switch selective signal following the specific input for the nonvolatile memory 172, when a specific input was detected from the dial switch 121.

Figure 11:
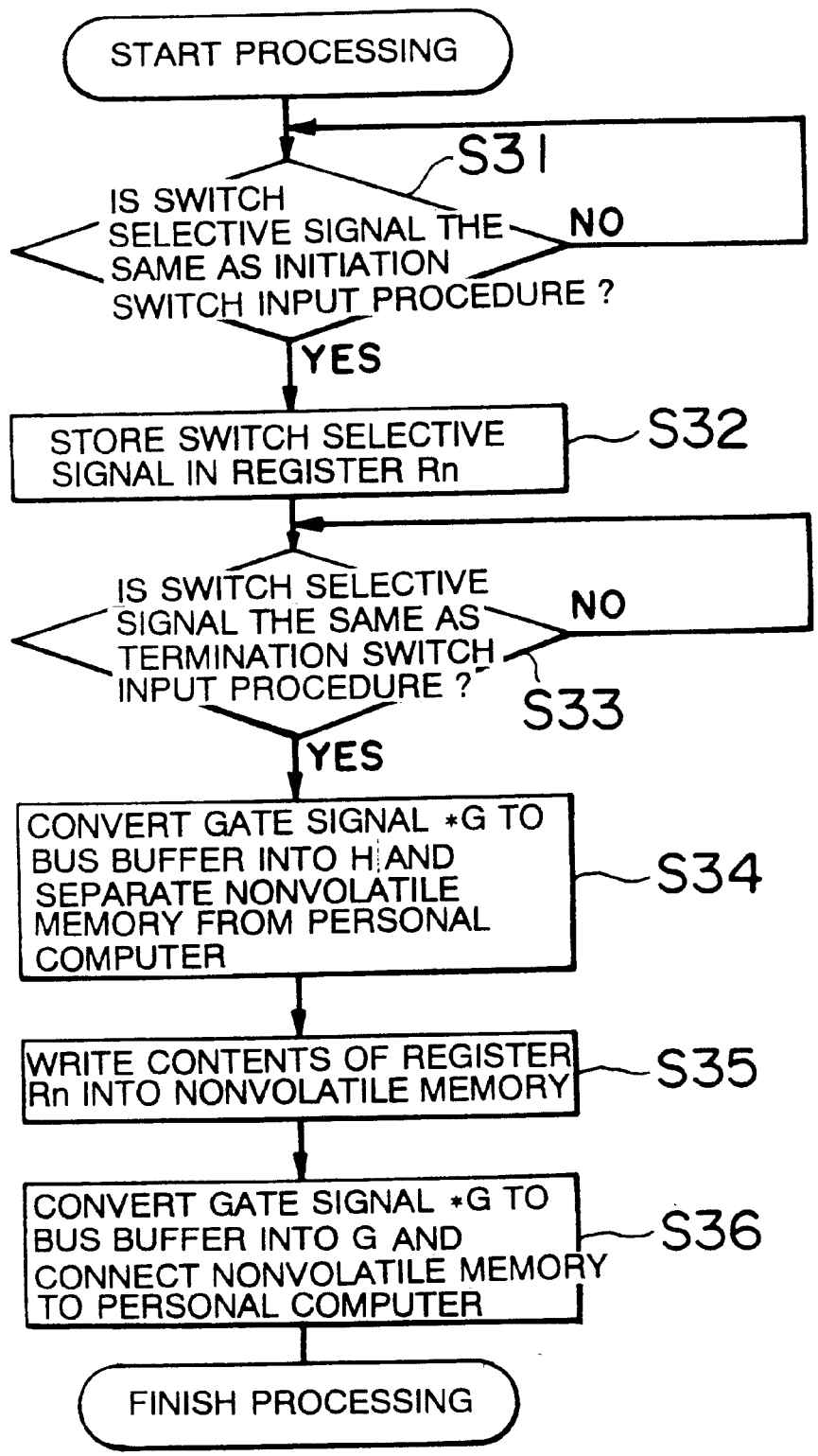
FIG. 11 is a flowchart indicating a procedure for writing data into a nonvolatile memory by a dial switching operation of the embodiment 4 of the present invention.

The writing of data into the nonvolatile memory 172 by the dial switching operation will be described in detail. FIG. 11 is a flowchart indicating a procedure for writing data into the nonvolatile memory by the dial switching operation of the embodiment 4 of the present invention. The writing of data will be described by referring to FIG. 11.

First of all, the MPU 171 compares the switch selective signal transmitted from the dial switch 121 with the predetermined initiation switch input procedure (Step S31). Hereupon, the process returns to the process of Step S31, when the switch selective signal is not the same procedure as the initiation switch input procedure.

On the other hand, the switch selective signal should be stored in the unillustrated register Rn installed on the MPU 171, when the switch selective signal is the same procedure as the initiation switch input procedure (Step S32).

Then, MPU 171 compares the switch selective signal with the predetermined termination switch input procedure (Step S33). Hereupon, the process returns to the process of Step S32, when the switch selective signal is not the same procedure as the termination switch input procedure.

On the other hand, the MPU 171 sets the gate signal *G which is transmitted to the bus buffer of the LSI 170 to "H" and separates the nonvolatile memory 172 from the personal computer 2, when the switch selective signal is the same procedure as the termination switch input procedure (Step S34).

Further, the MPU 171 reads out the switch selective signal from the unillustrated register Rn which exists inside, and writes it into the nonvolatile memory 172 (Step S35). The MPU 171 sets the gate signal *G which is transmitted to the bus buffer of the LSI 170 to "L", and connects the nonvolatile memory 172 to the personal computer 2 (Step S36).

By these operations, the data can be written into the nonvolatile memory 172 by the operation of the dial switch 121. Besides, the nonvolatile memory 172 can be accessed from the personal computer 2.

Accordingly, the telephone directory data can be exchanged between the communication device 1-3 and the personal computer 2, when the data is the telephone directory data. Besides, the exchange information can be limited by checking the password between the nonvolatile memory 172 in which the personal identification password is stored and the personal computer 2, when the data is a personal identification password.

<Embodiment 5>

Figure 12:
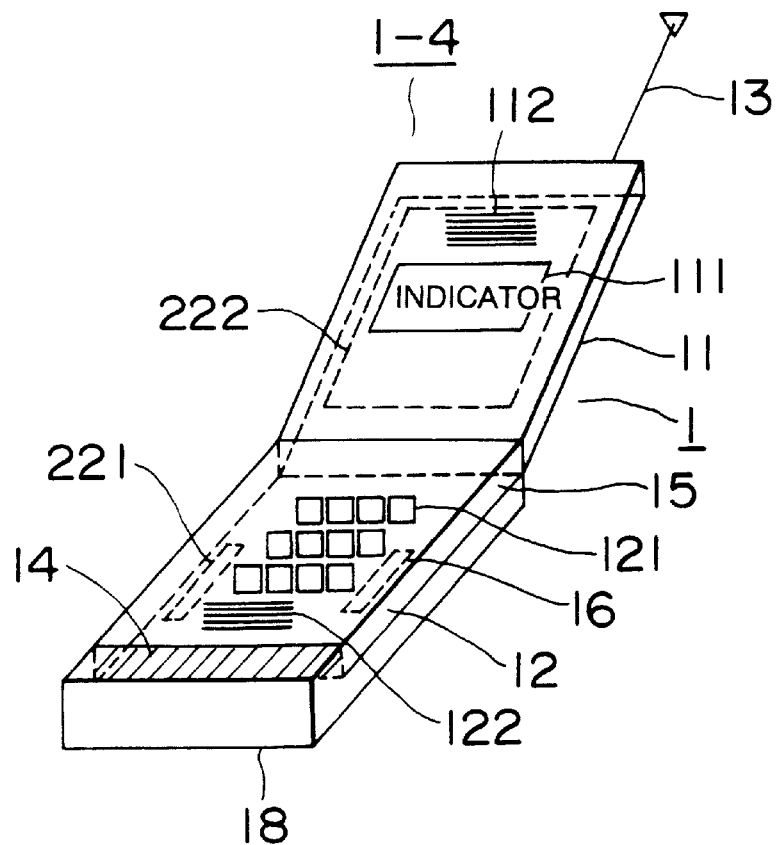
FIG. 12 is a diagram indicating a construction of an IC card-type radio communication device of the embodiment 5 of the present invention, when a conversation is executed.
Figure 13:
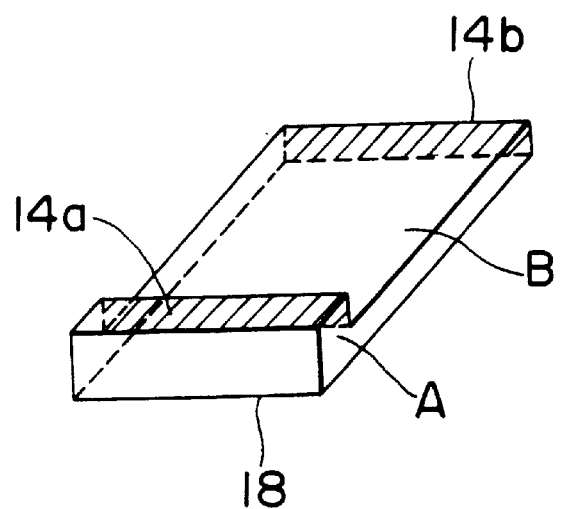
FIG. 13 is a diagram indicating a construction of another cell unit of the embodiment 5.

Then, the embodiment 5 of the present invention will be described. In the communication device 1-4 of the embodiment 5, another secondary cell unit 18 is added to the communication device 1 shown in the embodiment 5. FIG. 12 is a diagram indicating a construction of a communication device in the embodiment 5, when a conversation is executed. FIG. 13 is a diagram indicating a construction of another secondary cell of the embodiment 5.

Figure 14:
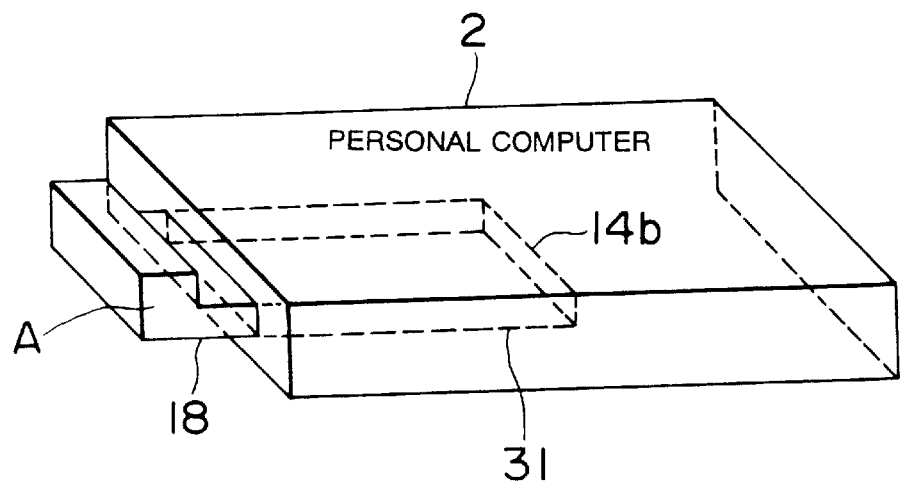
FIG. 14 is a diagram indicating a charging of another secondary cell unit by electric power supplied from a personal computer.

FIG. 14 is a diagram indicating a charge of another secondary cell unit by the electric power supplied from a personal computer. As shown in FIG. 13, another secondary cell unit 18 forms a physical shape of JEIDA/PCMCIA standard, and the edge unit A is projected against the plane unit B in step-wise.

A 68 pin connector 14a of JEIDA/PCMCIA standard is installed on one side of the edge unit A. The 68 pin connector 14a is a female connector, and interfits a male connector of the 68 pin connector 14 of JEIDA/PCMCIA standard, when the lower part body of equipment 12 of the communication device 1 is mounted on the plane unit B.

Besides, a 68 pin connector 14b of JEIDA/PCMCIA standard is installed on one side of the plane unit B of another secondary cell unit 18. The 68 pin connector 14b is a male connector. As shown in FIG. 14, the male connector interfits an unillustrated female connector, when another secondary cell unit 18 is inserted into the personal computer 2.

Figure 15:
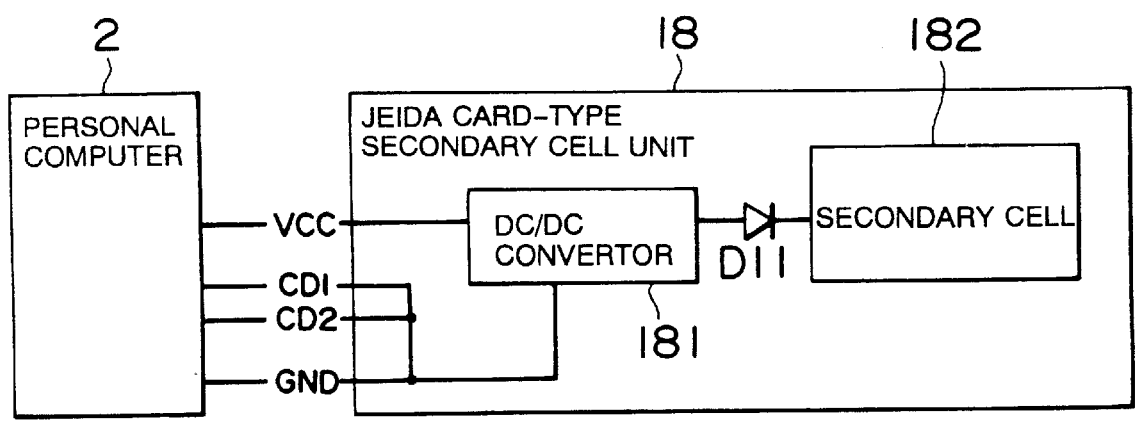
FIG. 15 is a construction diagram indicating another secondary cell unit of the embodiment 5.

FIG. 15 is a diagram indicating a construction of the another secondary cell unit. In FIG. 15, the construction of another secondary cell unit 18 is the same as the construction of the secondary cell unit 16 fundamentally. Hereupon, the another secondary cell unit 18 comprises a DC-DC convertor 181 which is connected to the personal computer 2 through the connector 14b, a diode D11 which is connected to the DC-DC convertor 181 and a secondary cell 182 which is connected to the diode D11.

Further, the CD terminal will be grounded and the electric power will be supplied from the personal computer 2 to the terminal VCC, if the secondary cell unit 18 is inserted into the personal computer 2.

In the above-mentioned construction, for instance, another secondary cell unit 18 should be connected to the communication device 1 when a conversation is executed, as shown in FIG. 12. The 68 pin connector 14a interfits the 68 pin connector 14, when the conversation is executed. The communication device 1-4 receives the electric power from the secondary cell 182 within another secondary cell unit 18 to be actuated.

On the other hand, another secondary cell unit 18 should be removed from the communication device 1 to connect the communication device 1 to the personal computer 2, when the data communication is executed. Then, the communication device 1 receives the electric power from the personal computer 2 to be actuated.

As mentioned hereinbefore, the consumption of the secondary cell unit 18 included in the communication device 1 can be reduced and the portability can be improved, since another secondary cell unit 18 is used. Further, as shown in FIG. 14, another secondary cell unit 18 can be inserted into the personal computer 2 to be charged, when another secondary cell unit is not used.

<Embodiment 6>

Figure 16:
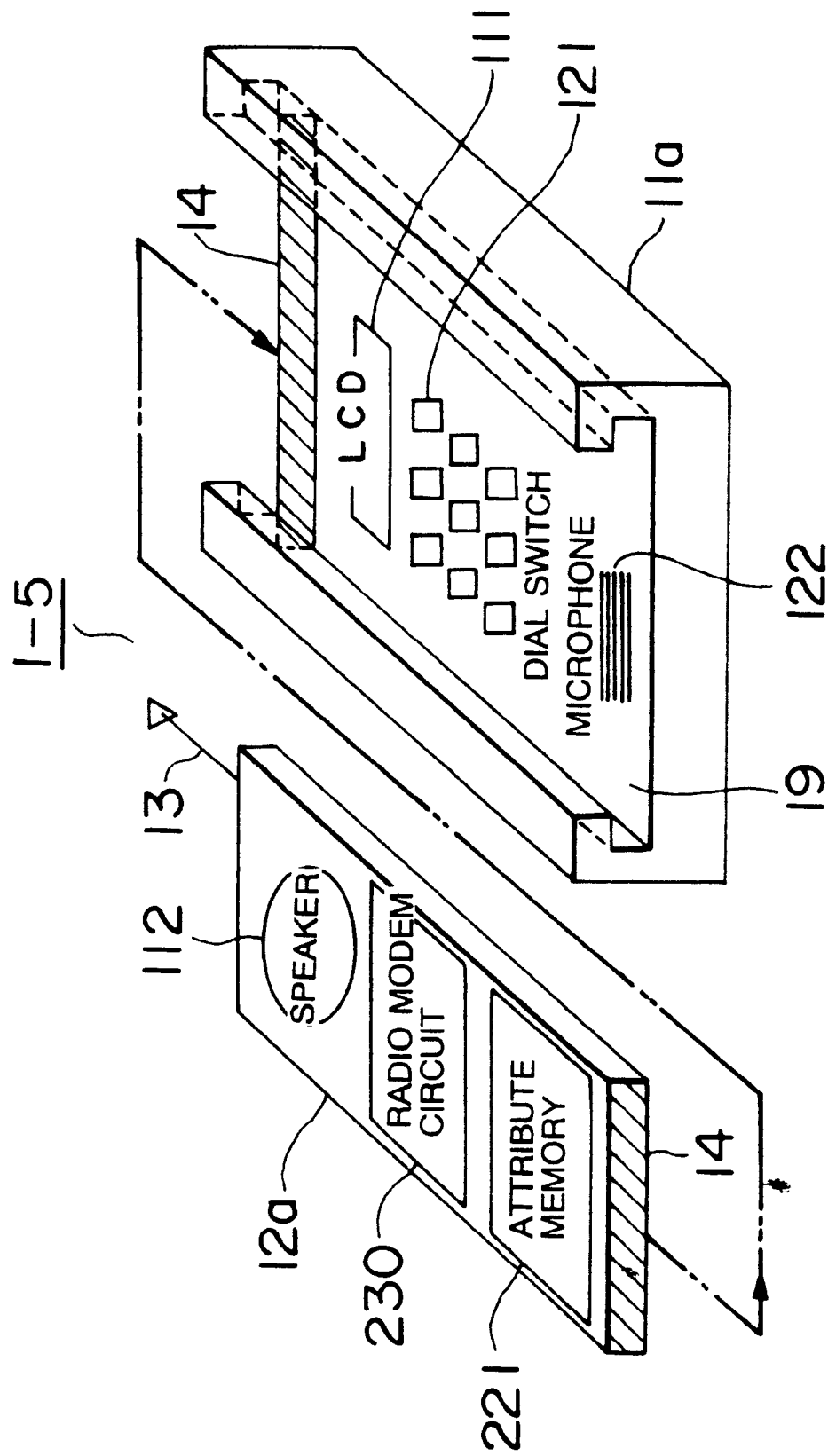
FIG. 16 is a construction diagram indicating an IC card-type radio communication device of the embodiment 6 of the present invention.

Then, the embodiment 6 of the present invention will be described. FIG. 16 is a diagram indicating a construction of the embodiment 6 of the present invention. The communication device 1-5 of the embodiment 6 is a slide-lock mode IC card-type communication device. In FIG. 16, the communication device 1-5 comprises a fixed body of equipment 11a and a slide body of equipment 12a which slides the fixed body of equipment. The fixed body of equipment 11a is separated from the slide body of equipment 12a electrically.

The slide body of equipment 12a comprises the speaker 112, the attribute memory 221, a radio modem circuit 230 and the connector 14. The fixed body of equipment 11a comprises a microphone 122, the dial switch 121, the indicator (LCD) 111, an unillustrated secondary cell and so on.

The radio modem circuit 230 comprises a microprocessor 222a within a portable telephone circuit 222 shown in FIG. 6, a modulation-demodulation LSI 222b, a ROM 222c, a RAM 222d and an EEROM 222e.

The fixed body of equipment 11a has a slot unit 19, and its cross-section forms a C-character shape. The slide body of equipment 12a is inserted into the slot unit 19, and the slide body of equipment 12a slides the slot unit 19.

Figure 17:
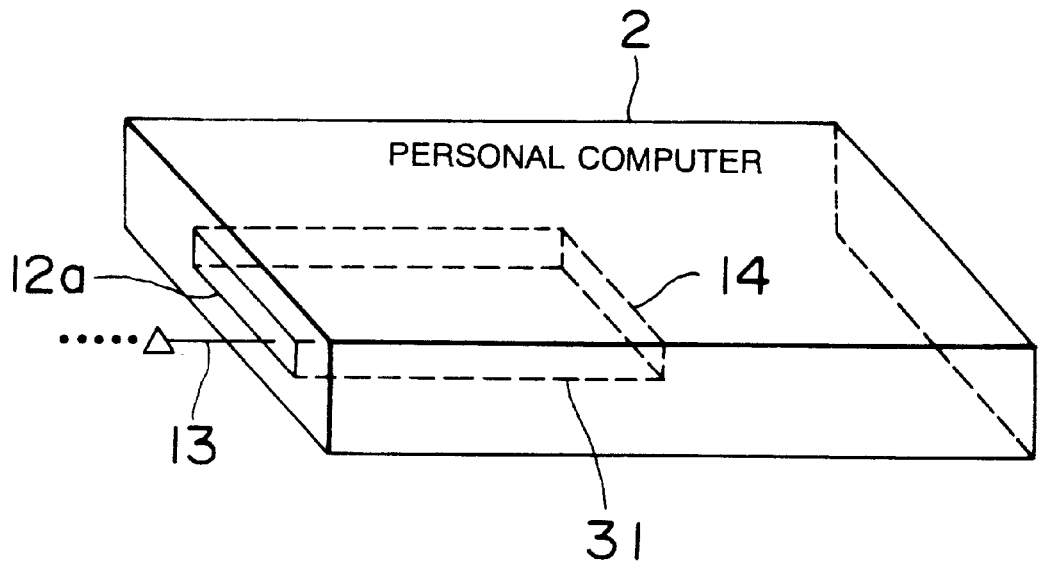
FIG. 17 is a diagram indicating a construction of an IC card-type radio communication device of the embodiment 6, when a radio data communication is executed.

As shown in FIG. 17, only the slide body of equipment 12a should be inserted into the card slot 31 of the personal computer 2, when the radio data communication is executed in the above-mentioned construction.

Whereupon, the connector 14 installed on the slide body of equipment 12a is connected to the unillustrated connector of the personal computer 2. Then, the slide body of equipment 12a receives the electric power from the power source of the personal computer 2 to be actuated. Namely, the radio data communication can be initiated.

Figure 18:
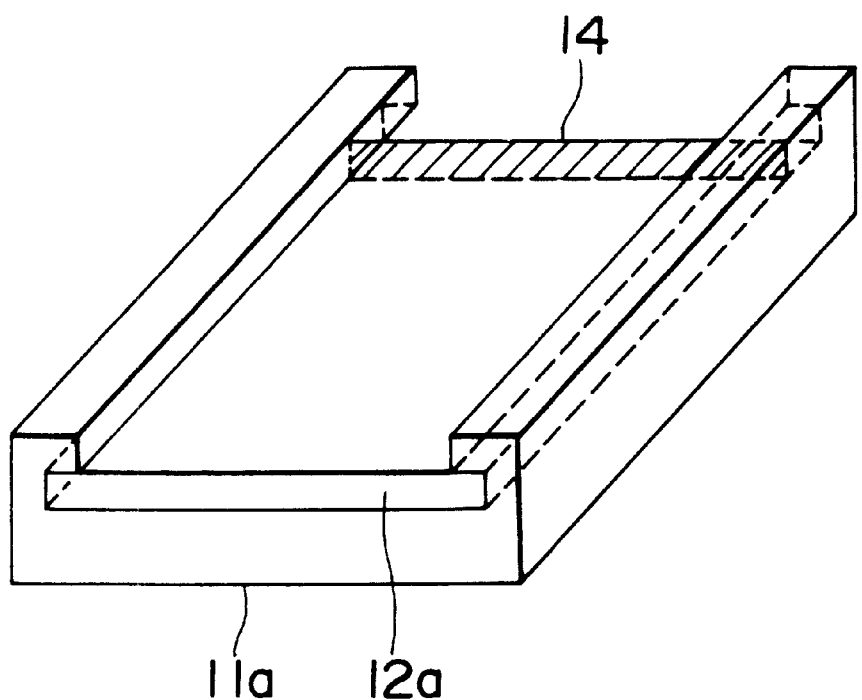
FIG. 18 is a diagram indicating a receiving state of an IC card-type radio communication device of the embodiment 6 as a portable telephone.

Besides, as shown in FIG. 18, the slide body of equipment 12a should be inserted into the slot unit 19 of the fixed body of equipment 11a, when the communication device is received as a portable telephone.

<Embodiment 7>

Figure 19:
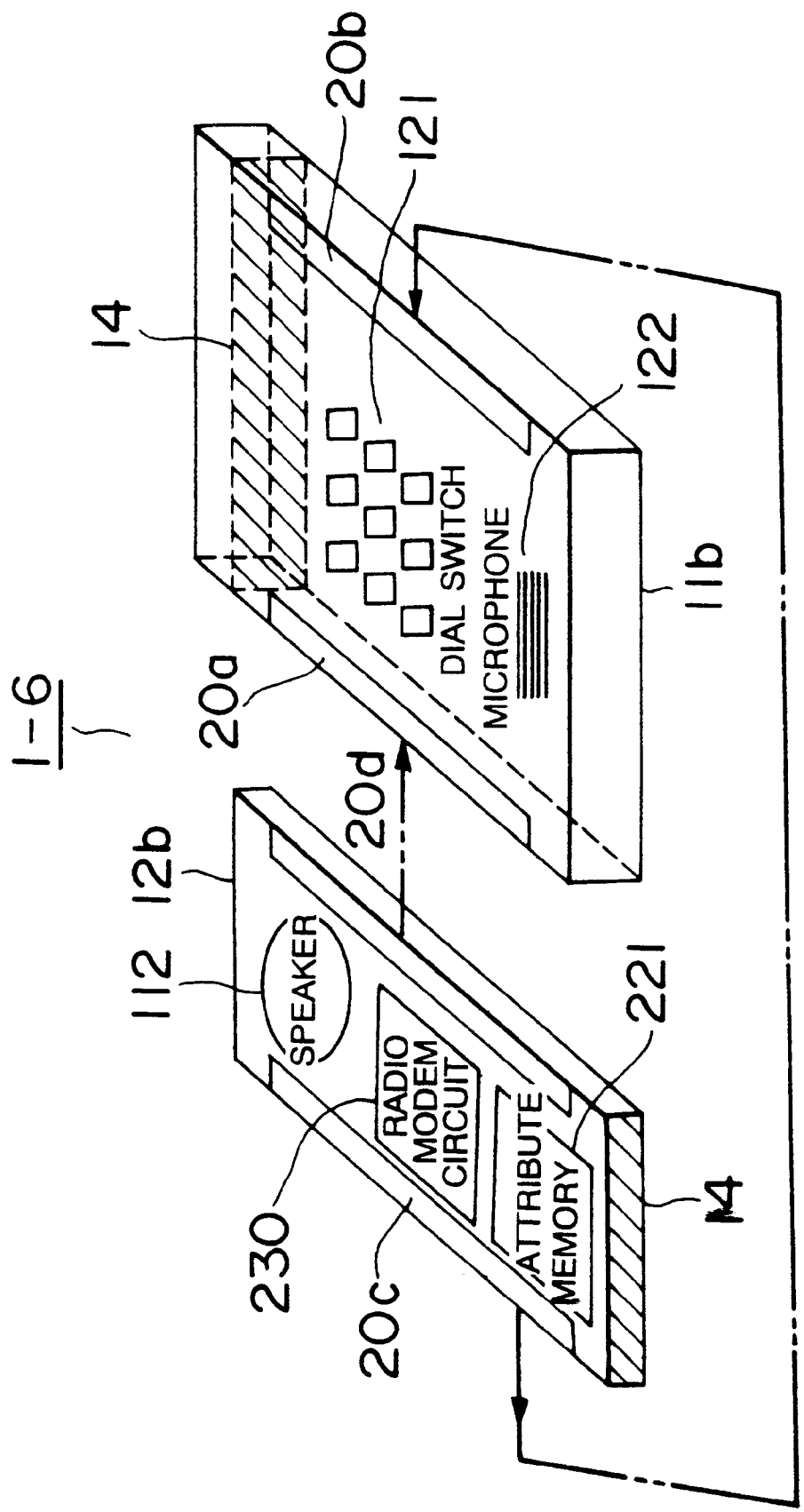
FIG. 19 is a construction diagram indicating an IC card-type radio communication device of the embodiment 7 of the present invention.

Then, the embodiment 7 of the present invention will be described. FIG. 19 is a diagram indicating a construction of the embodiment 7 of the present invention. The communication device 1-6 comprises a first body of equipment 12b and a second body of equipment 11b. The first body of equipment 12b is separated from the second body of equipment 11b electrically.

The first body of equipment 11b comprises the speaker 112, the attribute memory 221, the radio modem circuit 230, the connector 14 and the magnets 20c, 20d on the both sides.

The second body of equipment 12b comprises the microphone 122, the dial switch 121, the magnets 20a, 20b on the both sides, the connector 14, the unillustrated secondary cell and so on.

The magnet 20d corresponds to the magnet 20a, and the magnet 20c corresponds to the magnet 20b.

The radio data communication can be initiated by inserting only the first body of equipment 12b into the card slot 31 of the personal computer 2, when the radio data communication is executed in the above-mentioned construction.

Besides, the magnet 20d should be attached to the magnet 20a and the magnet 20c should be attached to the magnet 20b, when the communication system is received as a portable telephone. Namely, the first body of equipment 12b should be mounted on the second body of equipment 11b.

What is claimed is:

1. An IC card-type radio communication device, comprising:

a body of equipment which has an interface means which is in accordance with a predetermined standard and forms a physical shape which is in accordance with the standard, and is inserted into an entry installed on an external terminal unit;

a storage device which is installed on the body of equipment comprising a ROM and RAM, the ROM storing an attribute information of the body of equipment, the RAM storing an information necessary for data communication to data of the terminal;

a sound input device inputting a sound signal when a conversation is executed and a sound output device outputting a sound signal; and a modulation-demodulation device modulating and demodulating the data of the terminal unit on the basis of the informations stored in said storage device, when the body of equipment is inserted into the entry installed on the terminal unit, and modulating and demodulating the sound signal when the conversation is executed, wherein after the attribute information of the body of equipment is identified, the RAM stores the information necessary for data communication to the terminal which is received from the terminal.

2. A radio communication device, comprising:

a body of equipment insertable into an external terminal unit, wherein the body of equipment comprises a first region inserted into a body of the external terminal unit and a second region which remains outside the body of external terminal unit when the body of equipment is inserted;

a connector provided on said first region to be connected with the external terminal unit, wherein said connector conforms to a predetermined standard;

a microphone provided on said body of equipment for inputting a sound signal;

a speaker provided on said body of equipment for outputting a sound signal;

a modulation-demodulation section provided in the body of equipment to modulate and demodulate data relating to the external terminal unit and a sound signal;

at least a switch provided on said first region for inputting a dialed information, wherein said switch is covered by a body of said external terminal unit so as to be in an unaccessible state, when said first region is inserted into the external terminal unit; and a display disposed in the second region for displaying information, wherein said display displays the information at outside of the external terminal unit, when said first region is inserted into the external terminal unit.

3. A radio communication device according to claim 2, wherein the predetermined standard is a standard of Personal Computer Memory Card International Association (PCMCIA).

4. A radio communication device according to claim 2, further comprising:

an antenna provided on said second region to transfer a radio signal.

* * * * *